US00RE46537E

(19) United States
(12) Reissued Patent
Verbaere et al.

(10) Patent Number: US RE46,537 E
(45) Date of Reissued Patent: Sep. 5, 2017

(54) QUERYING AN OBJECT-ORIENTED DATA HIERARCHY USING RELATIONAL QUERY LANGUAGES

(71) Applicant: Semmle Limited, Oxford (GB)

(72) Inventors: Mathieu Verbaere, Oxford (GB); Oege de Moor, Oxford (GB); Elnar Hajiyev, Oxford (GB)

(73) Assignee: Semmle Limited

(21) Appl. No.: 14/877,992

(22) Filed: Oct. 8, 2015

Related U.S. Patent Documents

Reissue of:
(64) Patent No.: 8,554,782
Issued: Oct. 8, 2013
Appl. No.: 13/423,766
Filed: Mar. 19, 2012

U.S. Applications:
(63) Continuation of application No. 12/349,761, filed on Jan. 7, 2009, now Pat. No. 8,150,866.

(60) Provisional application No. 61/019,376, filed on Jan. 7, 2008.

(51) Int. Cl.
*G06F 17/30* (2006.01)

(52) U.S. Cl.
CPC .. *G06F 17/30395* (2013.01); *G06F 17/30401* (2013.01)

(58) Field of Classification Search
CPC ..... G06F 17/30395; G06F 17/30401
USPC ..... 707/759, 760, 761, 762, 763
See application file for complete search history.

(56) References Cited

U.S. PATENT DOCUMENTS

| | | | | |
|---|---|---|---|---|
| 5,761,493 | A * | 6/1998 | Blakeley | G06F 8/315 |
| 5,765,159 | A | 6/1998 | Srinivasan | |
| 5,794,231 | A | 8/1998 | Li et al. | |
| 5,905,982 | A * | 5/1999 | Carey et al. | 707/694 |
| 6,105,035 | A | 8/2000 | Monge et al. | |
| 6,173,290 | B1 | 1/2001 | Goldberg | |
| 6,748,377 | B1 * | 6/2004 | Attaluri | |
| 6,763,341 | B2 | 7/2004 | Okude | |
| 6,971,085 | B1 * | 11/2005 | Alcorn | 717/108 |
| 2004/0193575 | A1 | 9/2004 | Chen et al. | |
| 2004/0230584 | A1 * | 11/2004 | Nouri | G06F 17/30513 |
| 2006/0190461 | A1 * | 8/2006 | Schaefer | 707/100 |
| 2007/0038651 | A1 * | 2/2007 | Bernstein et al. | 707/100 |

(Continued)

OTHER PUBLICATIONS

Oege de Moor et al., "Keynote Address: .QL for Source Code Analysis", 7th IEEE International Working Conference on Source Code Analysis and Manipulation, IEEE Computer Society, Sep. 30, 2007.

(Continued)

*Primary Examiner* — Behzad Peikari
(74) *Attorney, Agent, or Firm* — Fish & Richardson P.C.

(57) ABSTRACT

A novel system, computer readable storage medium and method for creating re-usable queries over complex data including hierarchies, trees and graphs is described. This is achieved by an object-oriented query language, where a class is a logical property of a data item, and inheritance is implication between such properties. Virtual method calls execute all relevant method implementations in most specific classes. Expressions can be multi-valued, thus avoiding the need for naming intermediate results. All constructs closely follow the syntax of mainstream object-oriented languages like Java.

20 Claims, 15 Drawing Sheets

(AMENDED)

(56) References Cited

U.S. PATENT DOCUMENTS

| | | | | |
|---|---|---|---|---|
| 2009/0077001 | A1* | 3/2009 | Macready et al. | 706/57 |
| 2010/0205171 | A1* | 8/2010 | Shmueli et al. | 707/714 |

OTHER PUBLICATIONS

Oege de Moor, et al., ".QL: Object-Oriented Queries Made Easy", GTTSE, Jul. 2-7, 2007, Braga, Portugal.

* cited by examiner

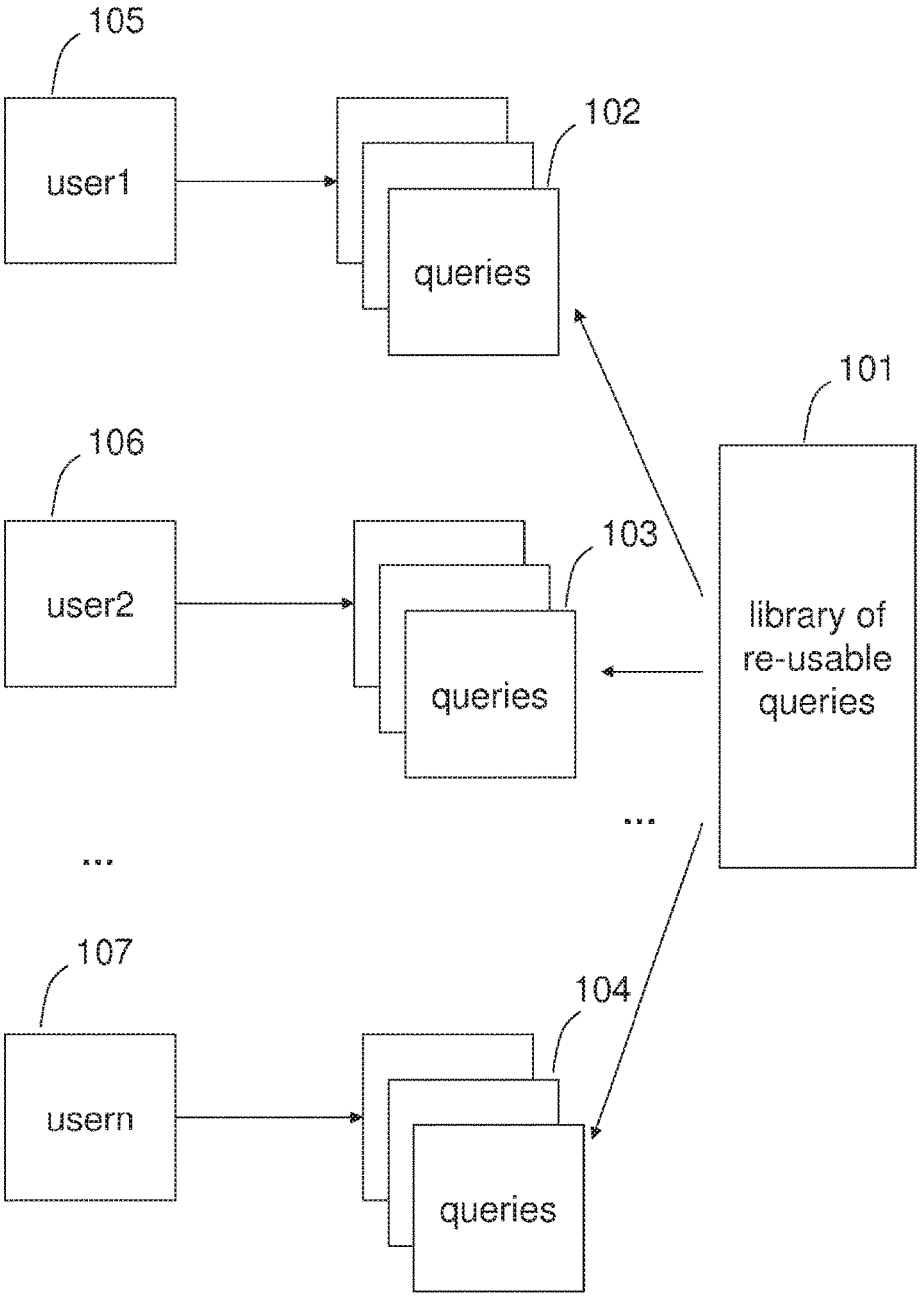
FIG. 1
(AMENDED)

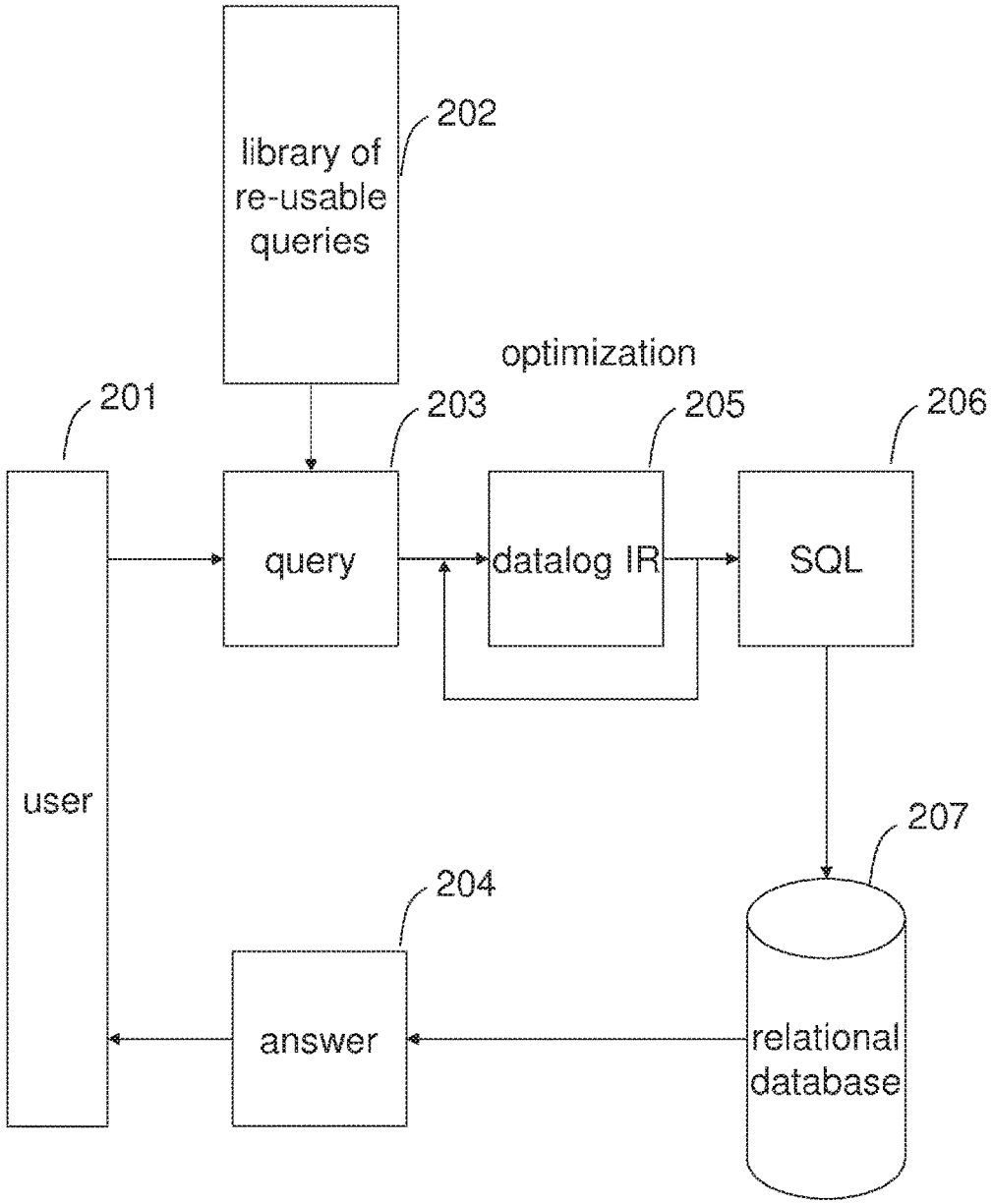
FIG. 2
(AMENDED)

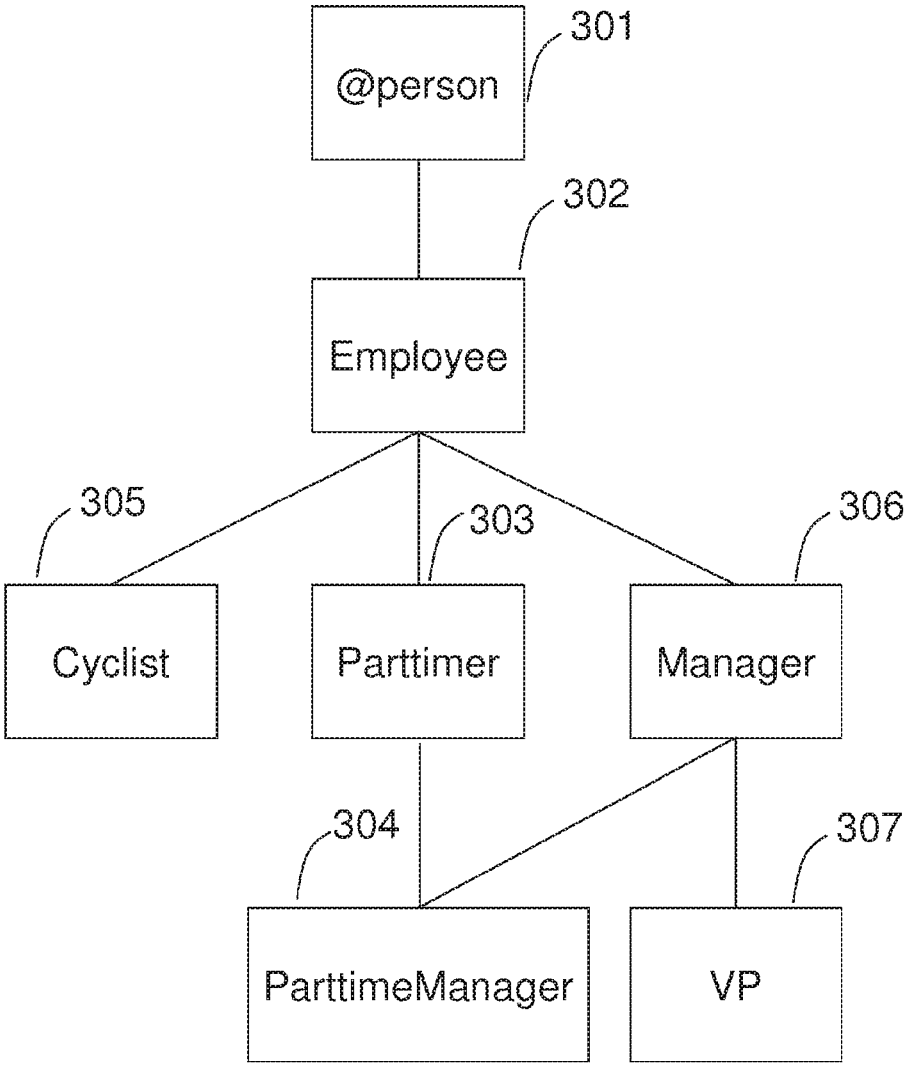
FIG. 3
(AMENDED)

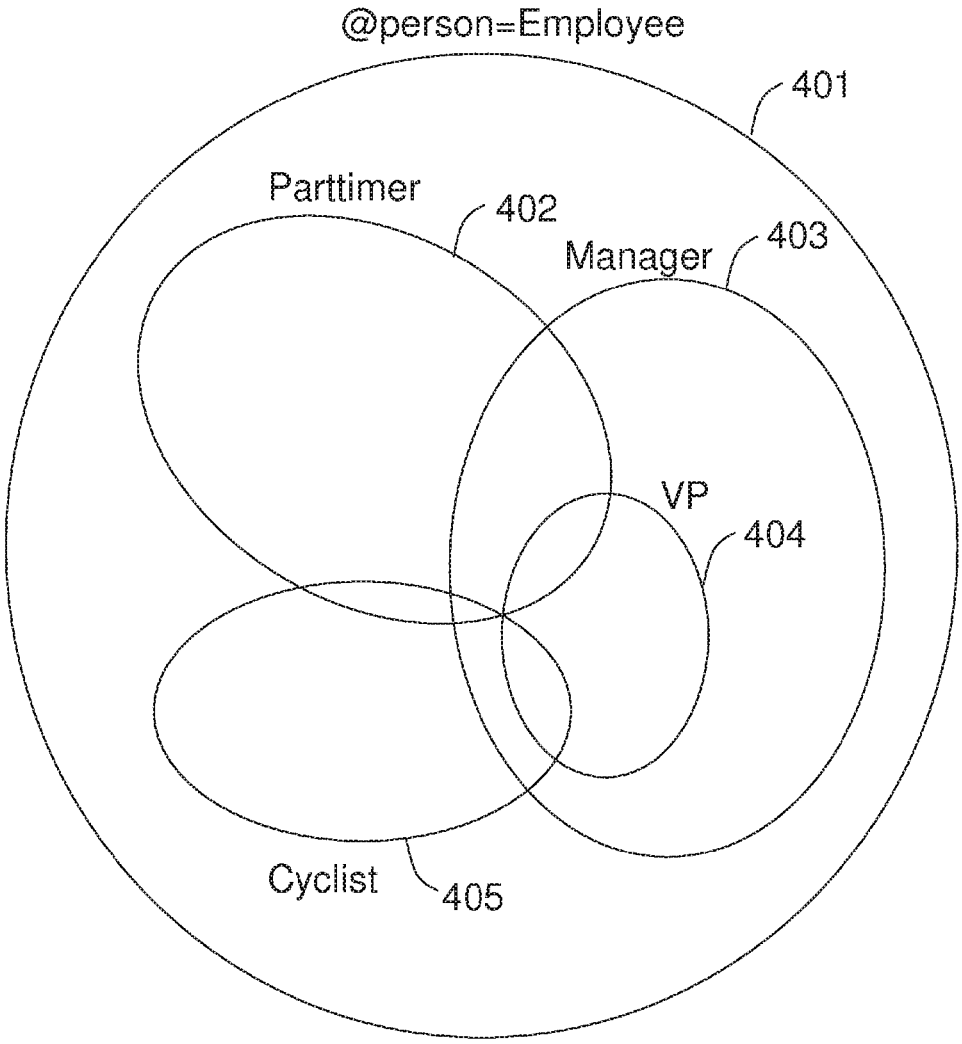
FIG. 4
(AMENDED)

| **Class** | **getChairColor()** |
|---|---|
| Employee | grey |
| Cyclist | green |
| Manager | blue |
| VP | red |
| ParttimeManager | purple |

FIG. 5
(AMENDED)

```
foreach class C defining getChairColor:
  if (C(e) &&
     forall subclass D of C defining getChairColor: not(D(e)))
  then m = definition of getChairColor in C;
        return e.m()
  else skip C
```

FIG. 6
(AMENDED)

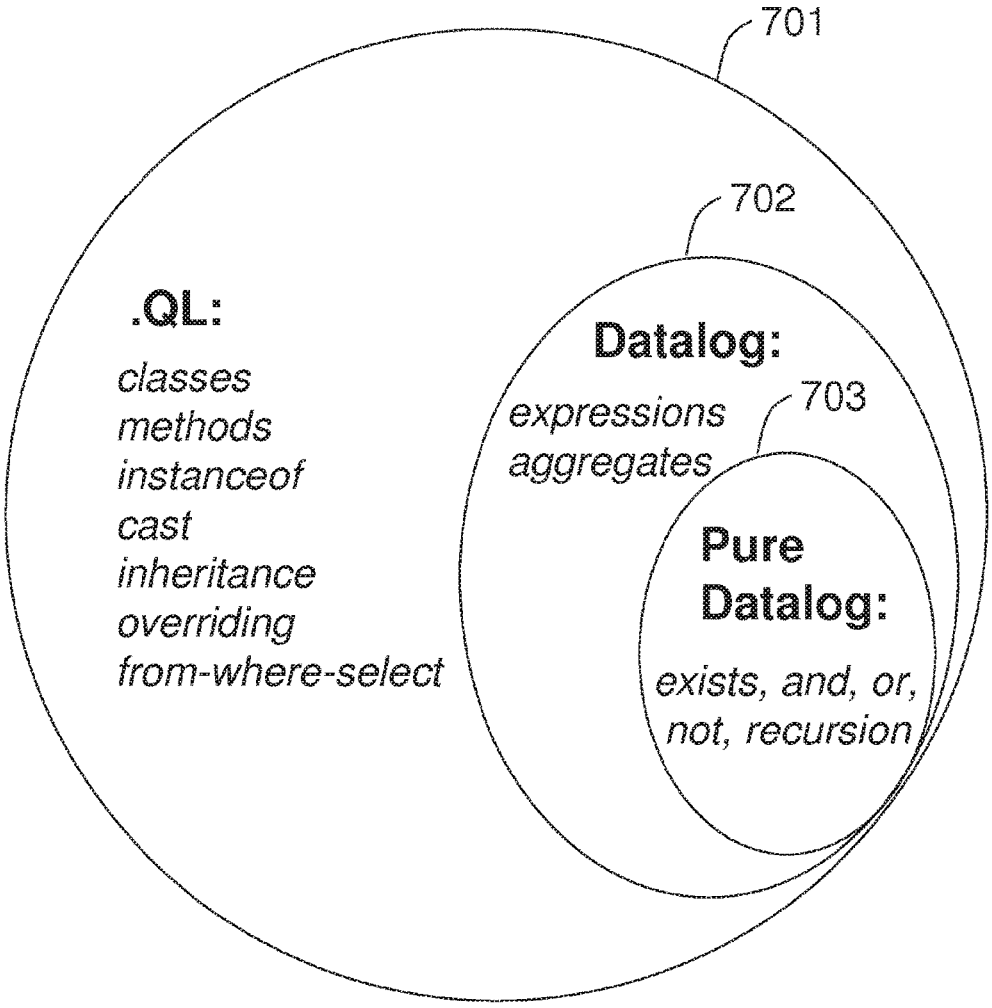
FIG. 7
(AMENDED)

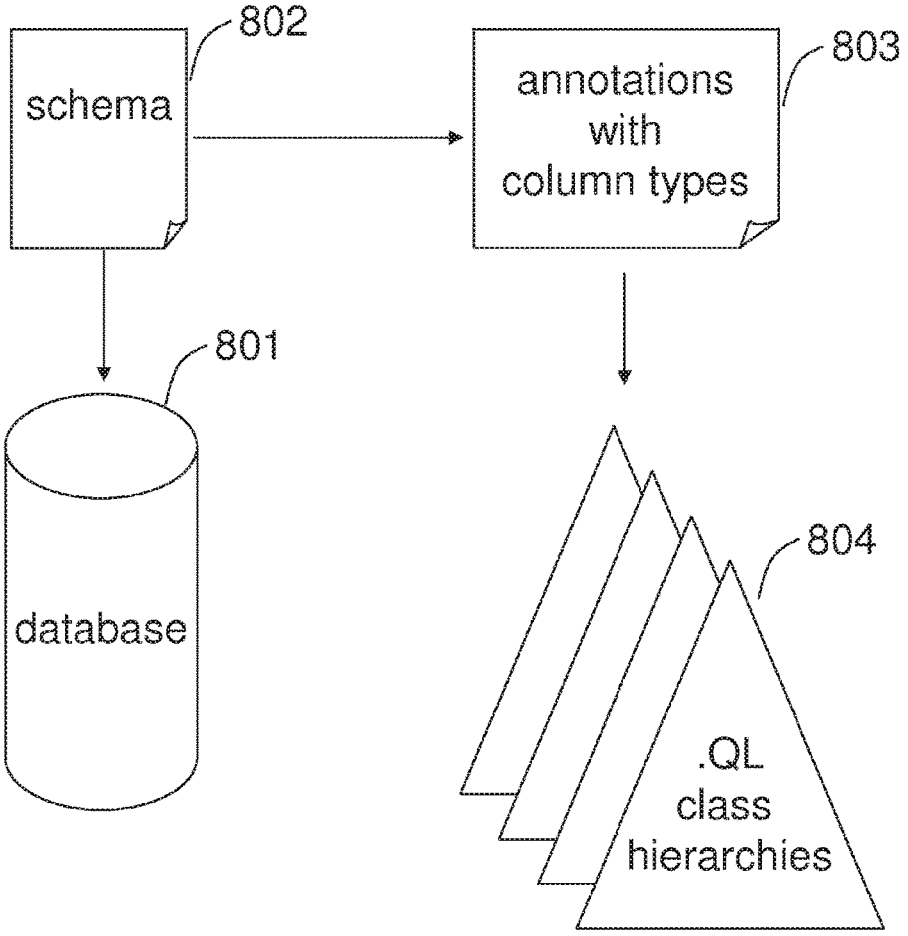
FIG. 8
(AMENDED)

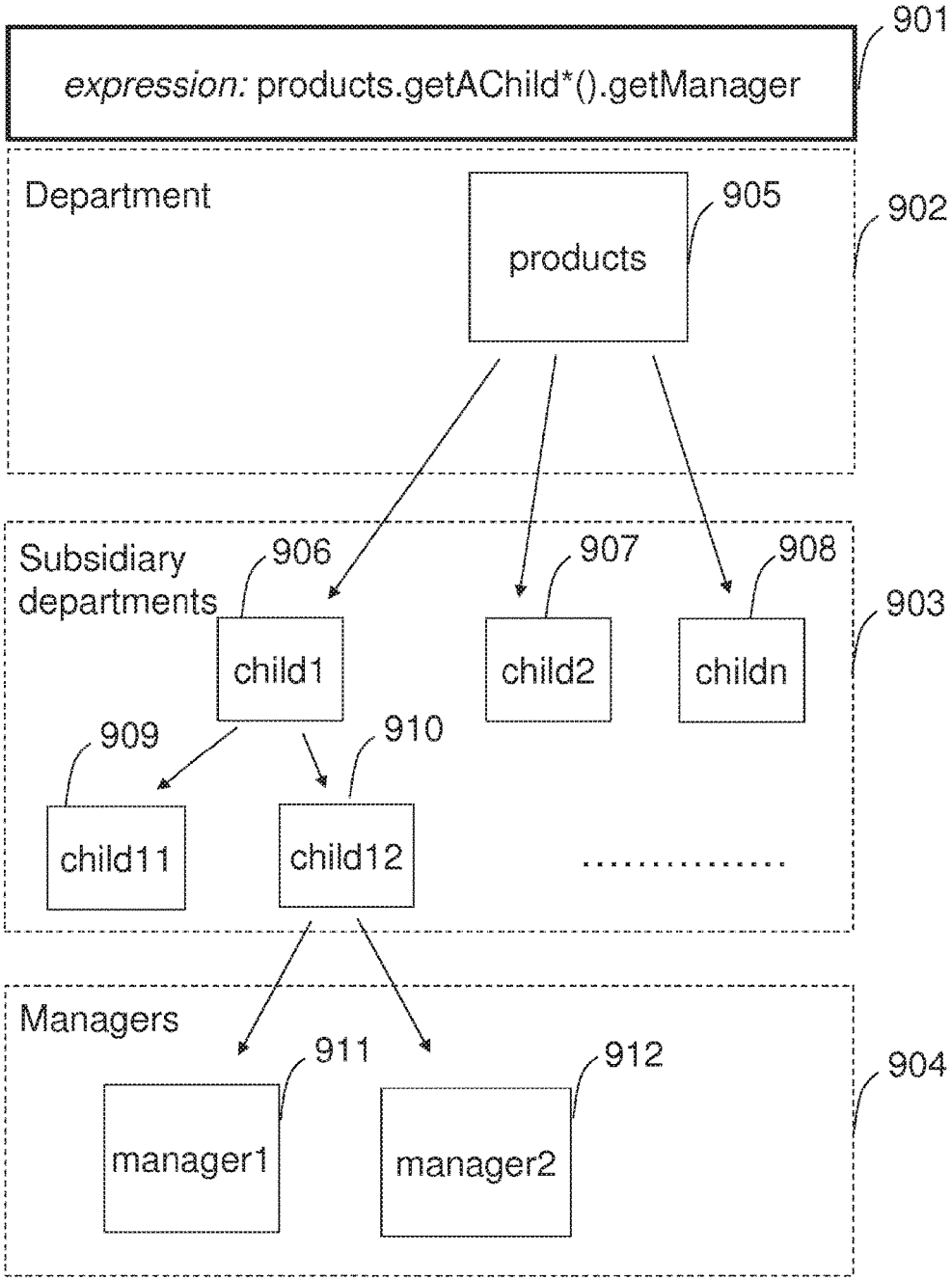
FIG. 9
(AMENDED)

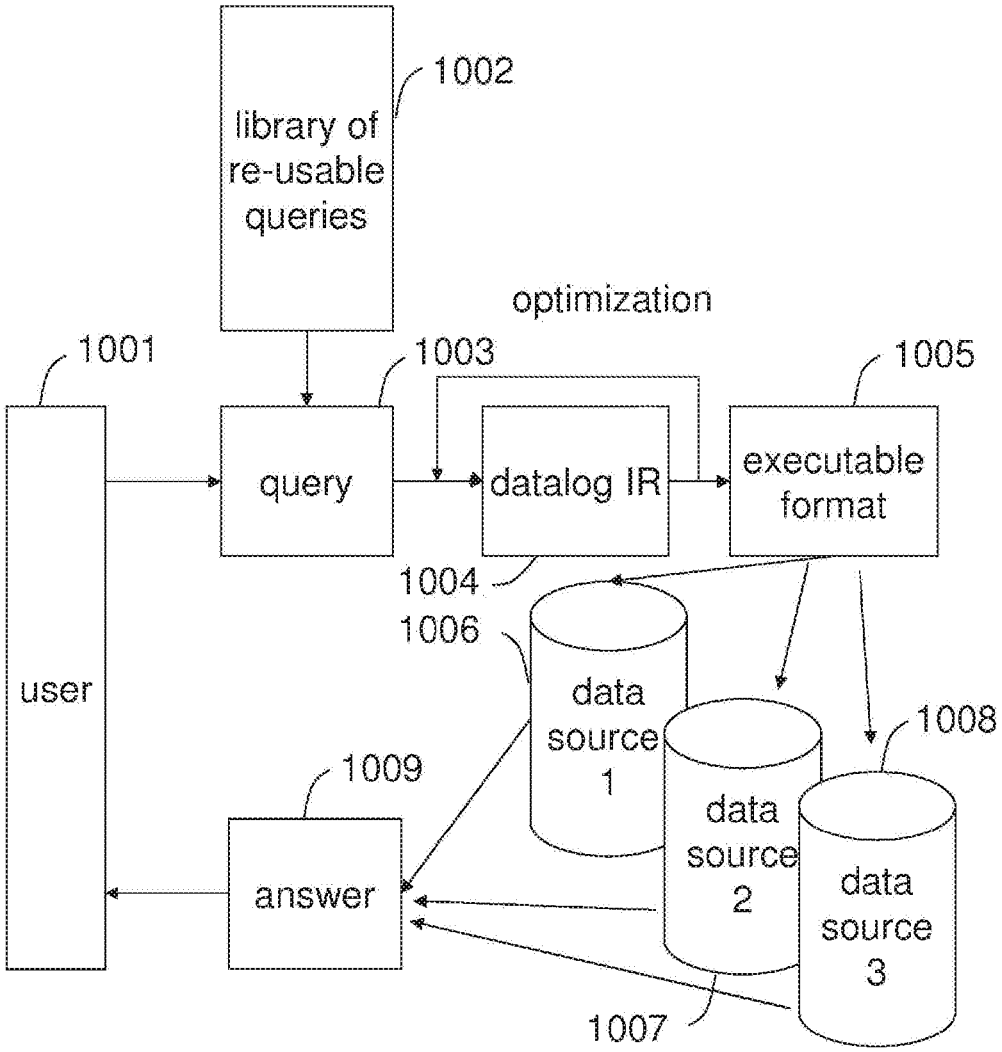
FIG. 10
(AMENDED)

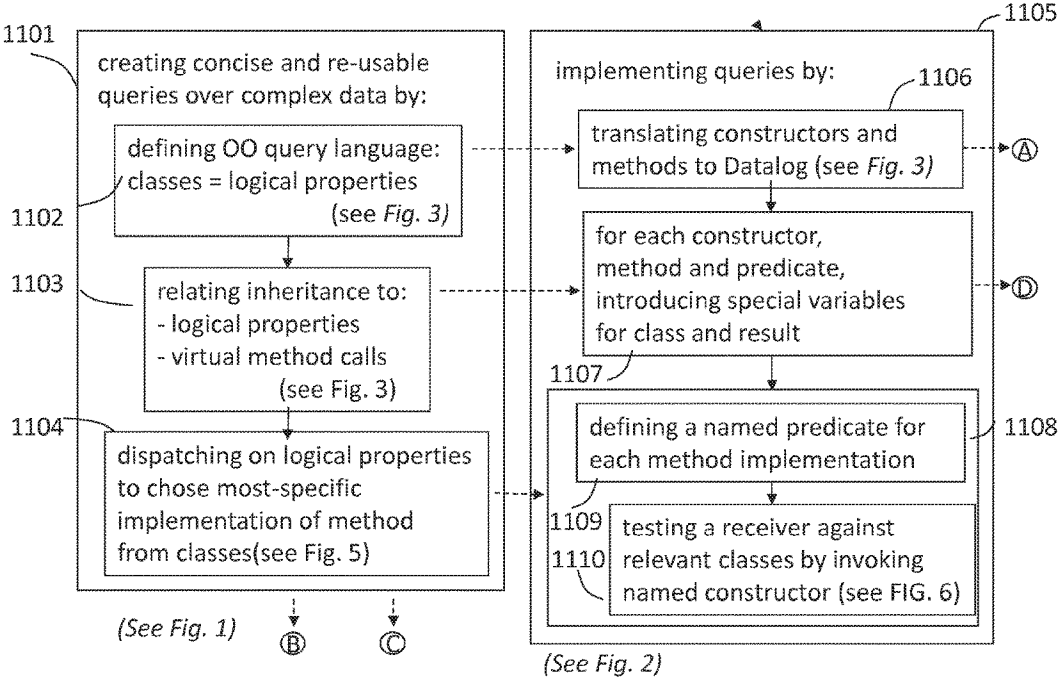
FIG. 11A
(AMENDED)

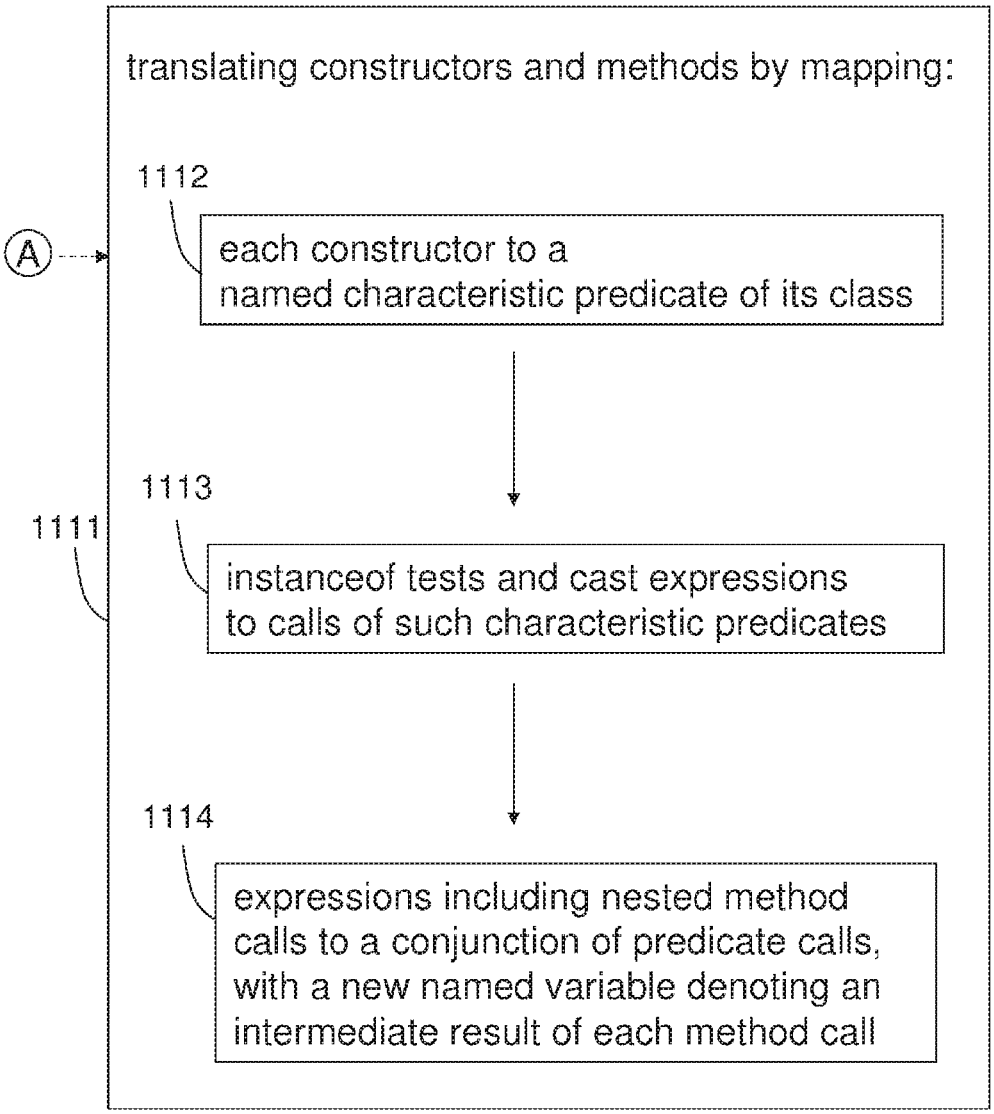
FIG. 11B
(AMENDED)

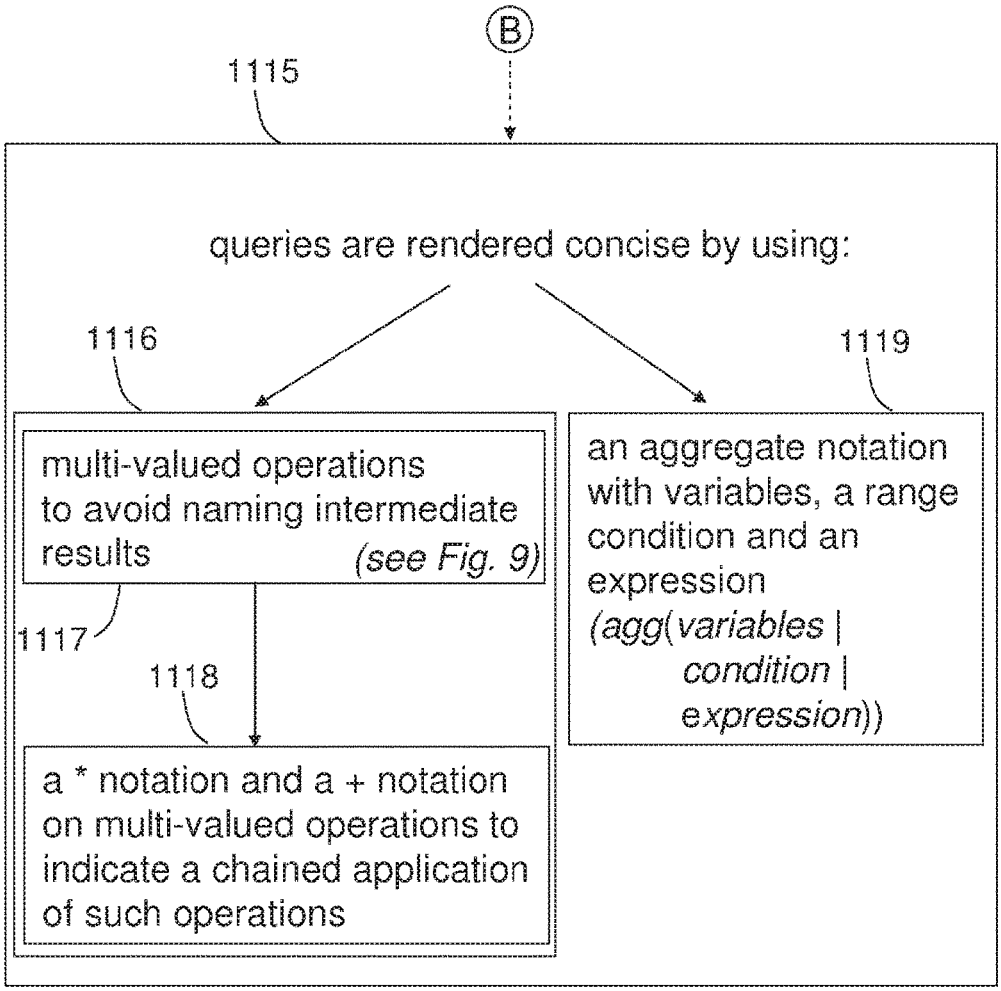
FIG. 11C
(AMENDED)

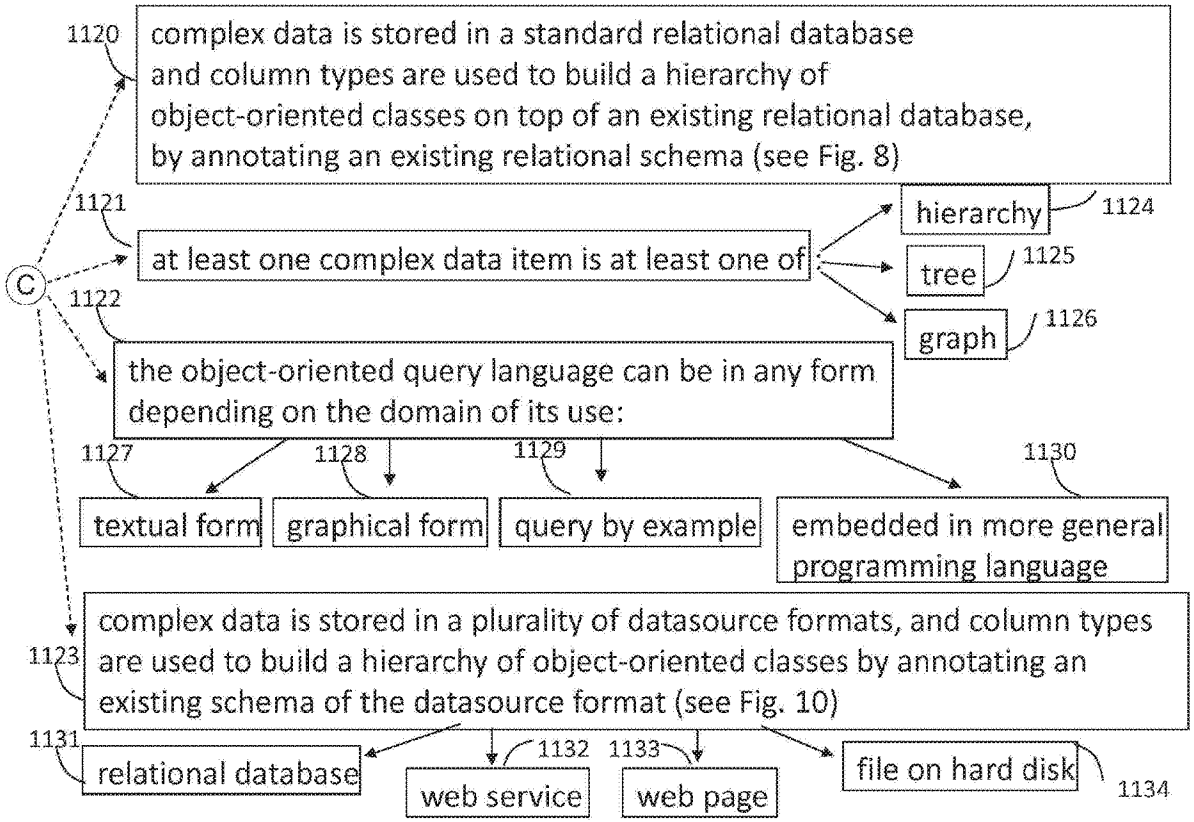
FIG. 11D
(AMENDED)

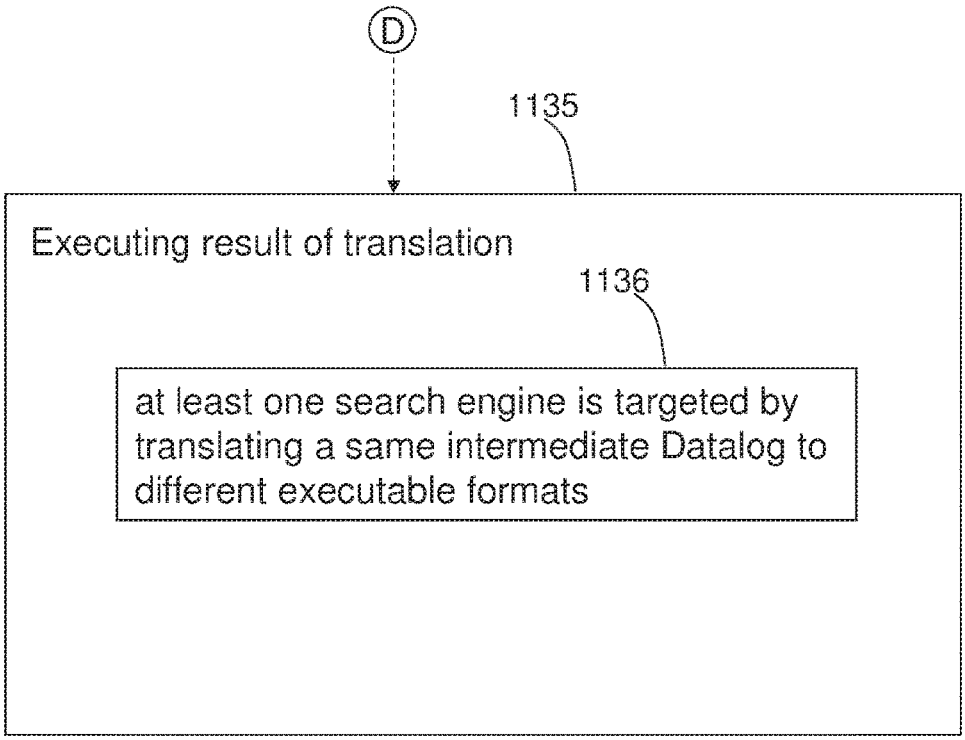
FIG. 11E
(AMENDED)

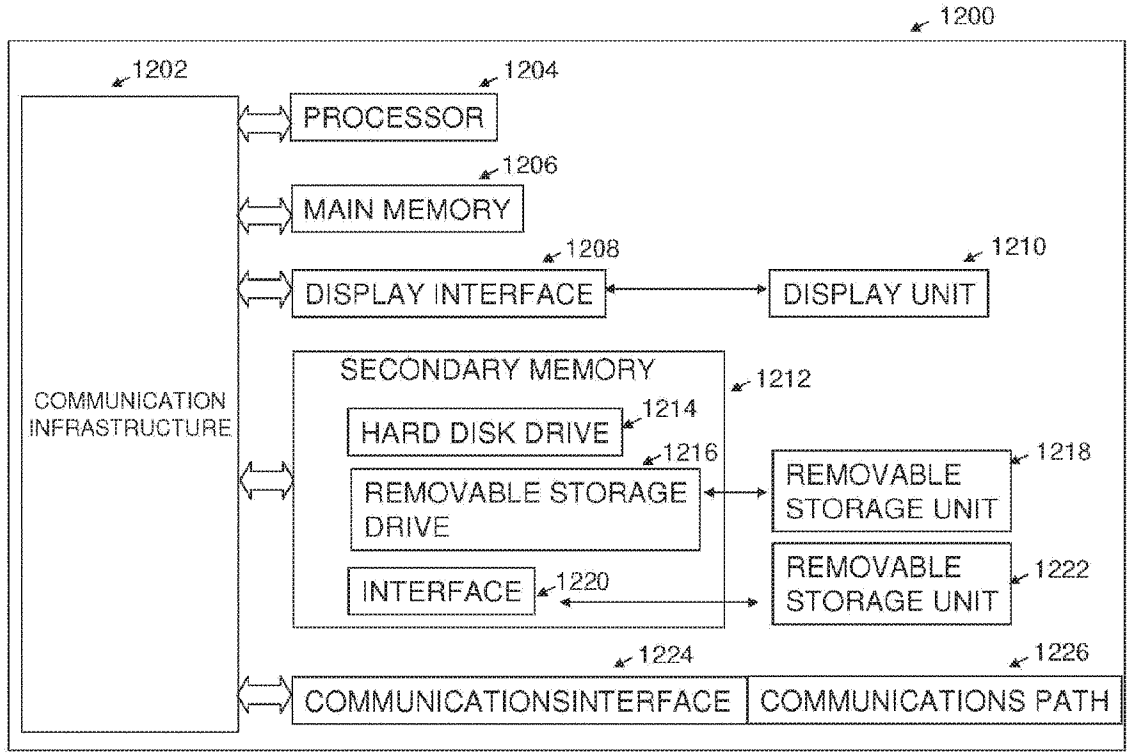
FIG. 12
(AMENDED)

QUERYING AN OBJECT-ORIENTED DATA HIERARCHY USING RELATIONAL QUERY LANGUAGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is [based on and claims priority from] *a continuation of* U.S. patent application Ser. No. 12/349,761 filed on Jan. 7, 2009, which is based on and claims priority from U.S. Provisional Patent Application No. 61/019,376, filed on Jan. 7, 2008, the entire disclosure of each of the above-referenced patent applications are hereby incorporated by reference in their entirety.

FIELD OF THE INVENTION

The present invention relates generally to information retrieval, in particular the way electronically stored data is accessed via queries that are formulated in a programming language. Such a special programming language for queries is commonly called a query language, and is the usual means for creating queries over data.

BACKGROUND OF THE INVENTION

Those skilled in the art know that SQL (Structured Query Language) is the most popular query language when the data has been stored in a relational database. Another example of a query language is XQuery, for data that has been stored in XML format.

The principal use for such query languages has traditionally been as part of a larger software system, where the application program issues queries (in SQL or XQuery) to an information retrieval component. In this usage scenario, queries are rarely written by hand; instead they are generated by the software system itself. Where they are written by hand, the author is typically an expert who is well-trained in query technologies.

Because of this usage within larger systems by experts, it has been possible to simultaneously design queries and the format of the data to be searched. If a query is awkward to express, or inefficient, the representation of the data can be adapted to circumvent these problems.

The above assumptions are however no longer valid in certain recent applications, such as a query interface to a wiki site, (i.e. a site that allows users to freely create and edit Web page content using any Web browser. Wiki supports hyperlinks and has a simple text syntax for creating new pages and crosslinks between internal pages on the fly), where many ad hoc queries are written by non-expert users and the design of the data representation cannot be changed to facilitate queries. Since these ad hoc queries are written by people and not by systems, it is important to be able to draw on libraries of existing queries, so that awkward details of the data representation can be encapsulated as common operations, allowing the query author to pose questions in the vocabulary of the problem domain that is familiar to the author.

Accordingly, what is desired, and which has not until now been developed, is a method and apparatus, embodied as a query language, that allows the construction of re-usable queries, so that non-experts can phrase questions in the vocabulary of the problem domain. Furthermore queries in such a language should be concise and easy to read. Finally the language should be close in syntax to mainstream programming languages, so it is easy to learn for those who already have some programming experience.

SUMMARY OF THE INVENTION

The present invention provides a means for creating re-usable queries over complex data, in particular hierarchies, trees and graphs. This is achieved by an object-oriented query language, where a class is a logical property of a data item, and inheritance is implication between such properties. Virtual method calls execute all relevant method implementations in most specific classes. Expressions can be multi-valued, thus avoiding the need for naming intermediate results. Methods can be recursive, thus enabling queries over recursive data. All constructs closely follow the syntax of mainstream object-oriented languages like Java.

In one embodiment, the present invention provides a system, a computer readable storage medium and a method for creating re-usable queries over complex data. The method includes defining a re-usable object-oriented query language with object-oriented classes treated as logical properties, wherein each logical property is defined by one or more specified classes of at least one complex data item. Inheritance is used to form new class with the specified classes, to the logical properties along with a plurality of virtual method calls that execute all applicable method implementations in at least one of the specified classes. Dispatching is used on the logical properties to choose at least one most specific implementation of an operation, wherein a most specific implementation is in a class where no subclasses define a same method.

The method in another embodiment includes implementing queries by translating possibly recursive object-oriented queries to pure Datalog using for each method and constructor of each class, a first special variable that holds a value that is a member of the class, and for each method that is not a predicate, a second special variable that holds a result of a method.

Further in this embodiment, the dispatching on the logical properties further includes: defining a named predicate p as predicate p(T1x1, . . . , Tnxn) {formula} for each one of the applicable method implementations, wherein the named predicate p has variables x1, . . . , xn so as to restrict a range of a relation, which contains tuples (x1, . . . , xn) where each xi has a type Ti; and testing a receiver against each relevant type and choosing the applicable method implementations, wherein testing a type of the receiver is achieved by invoking a named constructor for each class defining a method of a relevant signature, regardless of static types.

Still, further in this embodiment, the method comprises at least one of: (a) mapping each constructor to a named characteristic predicate of its class, which tests whether a value belongs to the class, by taking a logical conjunction of characteristic predicates of all superclasses and a property specified in the constructor; (b) mapping instanceof tests and cast expressions to calls of such characteristic predicates; and (c) mapping expressions including nested method calls to a conjunction of predicate calls, with a new named variable denoting an intermediate result of each method call.

Still, further in this embodiment, at least one search engine is targeted by translating a same intermediate Datalog to different executable formats.

In another embodiment, the queries are rendered concise by at least one of: (a) using multi-valued operations to avoid naming intermediate results; (b) using a * notation and a + notation on multi-valued operations to indicate a chained application of such operations; and (c) using an aggregate notation with variables, a range condition and an expression (agg(vars|condition|expr)).

In another embodiment, the present invention stores complex data in a standard relational database, and column types are used to build a hierarchy of object-oriented classes on top of an existing relational database, by annotating an existing relational schema.

In this embodiment, the complex data can be at least one of: (a) a data item in a hierarchy; (b) a tree; and (c) a graph.

In another embodiment, an object-oriented query language can be in any form depending on a domain of its use, including at least one of: (a) a textual form; a graphical form; (b) a query-by-example user interface; and (c) embedded in a more general programming language.

In still another embodiment, the complex data is stored in a plurality of datasource formats including at least one of: (a) a relational database; (b) a web service; (c) a web page; and (d) a file on hard disk; and (e) column types are used to build a hierarchy of object-oriented classes on top of such data formats, by annotating each relevant data format schema.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

FIG. 1 is a diagram illustrating how multiple users can employ a library of queries that are re-usable in that they can be invoked multiple times from different queries.

FIG. 2 is a drawing of a complete system embodying the invention.

FIG. 3 shows a sample inheritance hierarchy for creating re-usable queries on employee data in a company.

FIG. 4 shows a Venn diagram of the values that satisfy the characteristic properties of those classes.

FIG. 5 is a summary of the values returned by a sample virtual method named getChairColor.

FIG. 6 depicts an algorithm for virtual method dispatch, exemplified on the virtual method named getChairColor.

FIG. 7 illustrates the different sublanguages of the proposed query language, which are used in defining the meaning of the new features that enable the creation of re-usable queries.

FIG. 8 illustrates how column types (annotations on a normal relational schema) are used as the starting point of building a .QL class hierarchy.

FIG. 9 illustrates how multi-valued methods are evaluated.

FIG. 10 is a block diagram of a computer system with a multiple datasources which can be searched from a single .QL query, according to the present invention.

[FIGS. 11A-11E is a block diagram giving an overview of the components of the present invention. Solid arrows indicate the flow between components, while dashed arrows indicate additional levels of detail for these components.]

*FIG. 11A is a flow chart depicting an example method for creating concise and reusable queries.*

*FIG. 11B is a flow chart depicting an example method for translating constructors and methods.*

*FIG. 11C is a flow chart depicting an example method for rendering queries concise.*

*FIG. 11D is a diagram showing example of forms of complex data, forms of an object-oriented query language, and forms of storage of complex data.*

*FIG. 11E is a flow chart depicting an example method for executing the result of the translation shown in FIG. 11A and FIG. 11B.*

*Solid arrows indicate the flow between the steps each example method, while dashed arrows indicate additional levels of detail for these steps.*

FIG. 12 is a block diagram of a computer system useful for implementing the software steps of the present invention.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

The objective of the invention is depicted in FIG. 1: the ability to construct a library 101 of re-usable queries in an object-oriented query language. These re-usable queries in the library can be invoked from other queries 102, 103 and 104, where those queries are authored by multiple users 105, 106 and 107, all of whom can share the same library of re-usable queries.

An example flow diagram of the invention is shown in FIGS. 11A-11E. This diagram is intended as an overview of the invention, showing its essential components and the relation to other figures. The concepts introduced in the brief description of FIGS. 11A-11E will be further explained (with many concrete examples) afterwards. Concise and re-usable queries over complex data are created 1101 in three steps: first 1102 by defining an object-oriented (OO) query language where classes are logical properties. Second 1103 by relating the notion of inheritance to those logical properties as well as virtual method dispatch. Third 1104 by dispatching on those logical properties to choose a most-specific implementation of a given method from the available classes. Each of these three steps (1102, 1103 and 1104) will be further elaborated below; they are also further illustrated in other figures: 1102 is elaborated in FIG. 3, 1103 in FIGS. 4, and 1104 in FIG. 5.

The dashed lines in FIGS. 11A-11E indicate further levels of detail. In particular, queries are implemented 1105 by: 1106 translating constructors and methods to clauses in Datalog, a traditional query language in theoretical database research. That is, 1107 for each constructor, method and predicate, special variables are introduced for the current class, and (where necessary) also for the result. The dispatching of virtual methods 1108 is achieved by 1109 defining a named predicate for each method implementation, and 1110 testing a receiver of a virtual method call against relevant classes by invoking a named constructor. The translation to Datalog 1105 is further explained later, and it is also illustrated by FIG. 2; 1106 is illustrated by FIG. 7 and 1110 by FIG. 8.

The translation of constructors and methods 1111 is achieved by three mappings: first 1112, each constructor is mapped to a named characteristic predicate of its class. Second 1113, instanceof tests and cast expressions are mapped to calls of such characteristic predicates. Third 1114, expressions including nested method calls are mapped to a conjunction of predicate calls, with a new named variable denoting an intermediate result of each method call. We shall revisit 1112, 1113 and 1114 when further describing the mapping to Datalog.

The concise and re-usable queries in 1101 are rendered concise by 1115: first 1116, the introduction 1117 of multi-valued operations to avoid naming intermediate results and 1118 a * notation and a + notation on such multi-valued operations to indicate their chained application. A second device for rendering queries concise is an aggregate notation 1119 with variables, a range condition and an expression (agg(vars|condition|expr)). Multi-valued operations are further discussed below via multiple concrete examples; they are also further illustrated in FIG. 9.

The concise and re-usable queries in 1101 can be applied 1120 to complex data is stored in a standard relational database and column types are used to build a hierarchy of object-oriented classes on top of an existing relational database, by annotating an existing relational schema. This is further explained below via detailed examples, and also in FIG. 8.

The complex data in 1101 consists of 1121 at least one complex data item that is one of a hierarchy 1124 (for instance the organization of a company), a tree 1125 (for instance the representation of the syntax of a computer program) or a graph 1126 (for instance of connections in a social network). Further examples of complex data items will be discussed below.

The object-oriented query language of 1101 can be 1122 in any form depending on the domain of its use: textual form 1127 (the most common way of presenting queries), graphical form 1128 (which may be more suited in applications to business intelligence), query-by-example 1129 (common when non-experts wish to run a query similar to a previous one), or embedded in a more general programming language 1130 (examples of such general programming languages are Java and C++).

The concise and re-usable queries can be applied 1123 to complex data that is stored in a plurality of datasource formats, and column types are used to build a hierarchy of object-oriented classes by annotating an existing schema of the datasource format. The datasource format can be one of a relational database 1131, a web service 1132, a web page 1133, or a file on hard disk 1134. This is further illustrated in FIG. 10.

The result of the translation 1105 can be executed 1135 by translating a single intermediate Datalog program to different executable formats 1136. This concludes the description of the overview of the invention as depicted in FIGS. 11A-11E, and we now proceed to further elaborate the concepts introduced in FIGS. 11A-11E.

For brevity, we shall name the novel object-oriented query language .QL. The structure of the presentation is as follows: first we show how in .QL, a traditional database schema is annotated to enable the construction of a class hierarchy. Here we chose a typical toy example found in textbooks on databases, namely a company database involving employees, departments and so on. Next, we show how a hierarchy of concepts can be constructed on top of that annotated schema. Finally, we proceed to describe in detail how .QL may be realized by a translation of its novel features to a more traditional query language.

Annotating a Database Schema with Types

A fictitious company named Fuzzles Inc. has a database for its company structure, and the schema for that database is shown below. It is a normal SQL schema, except that each field has been annotated with a so-called column type. In the schema below, column types are indicated by italic font. As shown in FIG. 8, these column types 803 are a unique feature of .QL, allowing programmers to build class hierarchies 804 on top of a schema 802 in a normal relational database 801.

```
employee(int ssn: @person, varchar(100) name: string ref)
department(int did: @department, varchar(100) name: string ref)
hassubsidiary(int parent: @department ref, int child: @department ref)
worksin(int ssn: @person ref, int did: @department ref)
manages(int ssn: @person ref, int did: @department ref)
parttime(int ssn: @person ref, float percentage: float ref)
cyclist(int ssn: @person ref, int cycle: @cycle)
driver(int ssn: @person ref, int car: @car)
```

To take one example, the 'ssn' field of the 'employee' table has been annotated with @person. This in fact serves as a declaration of the type @person, defining it to be the set of values that occurs in that column in the database. By contrast, in the 'worksin' relation, the 'ssn' field is annotated with @person ref, expressing the fact that there it is just a reference to the @person type. It is important to distinguish column types from the normal representation types (like varchar (100)) that are part of the normal database schema. In the above schema, representation types are in normal font and column types are in italics.

It may appear that column types are similar to the integrity constraints found in traditional databases, where the programmer can indicate that a field refers to another field. Column types encode that same information (the ssn field of worksin refers to the @person type, which are precisely the values in the ssn field of employee). However, column types have another role, namely to express that fields do not share values. For example, the did field of the department table is an integer (according to its representation type), and the ssn field of employee is also an integer. However, since the two fields have different column types, the same integer cannot appear both as a value of did and a value of ssn.

Building Classes

Shown now is how the vocabulary of a problem domain (in this case the company structure) can be encapsulated as a hierarchy of concepts, and we call these concepts "classes". By creating such a hierarchy, we enable non-experts to ask questions about the data in familiar terms. The use of the word "classes" draws on an analogy with other fields of computer programming, where it has proved economical to build libraries of common operations, which can be reused as-is, or adapted to new requirements, without having to reconstruct many similar queries from scratch. The most successful paradigm for achieving such re-use is object-oriented programming. Examples of object-oriented programming libraries are the Java collection classes, and the C++ Standard Template Library STL. A simple combination of object-oriented programming and query languages has however long been known to be impossible (Jeffrey D. Ullman: A Comparison between Deductive and Object- Oriented Database Systems. In: Claude Delobel, Michael Kifer, Yoshifumi Masunaga (Eds.): Deductive and Object-Oriented Databases, Second International Conference, DOOD'91, Munich, Germany, Dec. 16-18, 1991, Proceedings. Lecture Notes in Computer Science 566 Springer 1991, ISBN 3-540-55015-1: 263-277. The aforementioned reference is hereby incorporated by reference in its entirety). However, despite that impossibility, we find it useful to use the terminology of object-oriented programming in this context, as it is familiar to those skilled in the art, and the analogy may thus be helpful in creating an intuition about the semantics as used herein.

A Class for Employees

An employee is any person employed by Fuzzles Inc. Within Fuzzles, an employee's status is indicated by the colored pattern of her chair. The default is a grey pattern. A chair can however have more than one color, as we shall see shortly. Here is a class for defining employees, with a method for reporting the name of an employee, the department she works in, and the color of her chair, and finally a toString method for producing a string:

```
class Employee extends @person {
   string getName( ) { employee(this,result) }
   Department getWorksInDepartment( ) { worksin(this,result) }
   string getChairColor( ) { result="grey" }
   string toString( ) { result=this.getName( ) }
}
```

In general, a .QL class is a logical property. Here the logical property is particularly simple, as it is just that this occurs as a value in the @person column type. The body of a method is a relation between two special variables named this and result. If there are method parameters, those can also be used in the method body. Note that while we use the syntax and terminology of object-oriented programming in the presentation of .QL classes, the actual meaning is radically different from traditional object-oriented programming languages.

Given the above Employee class, one can write a select statement to report all employees named 'John', with their department and chair colors:

```
from Employee e
where e.getName( ).matches("John %")
select e, e.getWorksInDepartment( ), e.getChairColor( )
```

A Class for Cyclists

In an attempt to encourage eco-friendly behavior, employees who cycle to work get a green chair. That way, all their colleagues can see that they make a special effort. As a class, Cyclist extends Employee, and overrides its getChairColor method:

```
class Cyclist extends Employee {
   Cyclist( ) { cyclist(this,_) }
   string getChairColor( ) { result="green" }
}
```

As mentioned earlier, a class in .QL is a logical property. Here that logical property is that this is an Employee who furthermore occurs in the cyclist relation. The employee part of the property is expressed by saying that Cyclist extends Employee, whereas the cyclist part is specified in the constructor Cyclist( ). The underscore (_) indicates a don't-care value.

Again, we note the discrepancy between traditional object-oriented programming and the notion of 'extends' in .QL: in .QL 'extends' is a form of logical conjunction, and therefore a semantic property. By contrast, in a language like Java, inheritance is a syntactic construct, and not a logical operation.

When a method call e.getChairColor( )is evaluated, the .QL engine determines what the most specific classes are for e, and it uses the definition of getChairColor from those classes. This process is detailed in FIG. 6. As we shall see shortly, it is possible to have more than one most specific class for a value.

Modelling Departments

Next, we define a class for departments. Within Fuzzles Inc., departments can have subsidiaries, which can have subsidiaries of their own, and so on. A department has a direct size (everyone who works just at that level), and also a total size, which is the sum of the direct sizes of all its subdepartments including itself:

```
class Department extends @department {
   int getDirectSize( ) { result = count(Employee e |
                                 worksin(e,this)) }
   int getSize( ) { result = sum(Department d |
                                 this.getAChild*( ) = d |
                                 d.getDirectSize( )) }
   Department getAChild( ) { hassubsidiary(this,result) }
   Department getParent( ) { hassubsidiary(result,this) }
   Manager getManager( ) { manages(result,this) }
   string toString( ) { department(this,result) }
   string getName( ) { result=this.toString( ) }
}
```

The getAChild method may return multiple results, one for each subsidiary of this department. The method getDirectSize presents a first example of an aggregate, namely to count the number of employees who work in this department. Next, in computing the total size, we apply the getAChild method in a chained fashion, thus finding all subsidiaries of the current department. To be more precise, this.getAChild*( ) returns the results of evaluating just this, or this.getAChild( ) or this.getAChild( )getAChild( ), . . . and so on. We take the sum of the direct size of all departments d obtained in this fashion.

A query to find all subsidiaries below a given department named "Products" might read as follows:

```
from Department products
where products.getName( ) = "Products"
select products.getAChild*( )
```

To get all the managers who work for those subsidiaries, you can simply write

```
from Department products
where products.getName( ) = "Products"
select products.getAChild*( ).getManager( )
```

Note that products.getAChild*( ).getManager( ) may return many results. Such expressions are sometimes said to be 'many-valued'. The evaluation of this expression 901 is illustrated in FIG. 9. The department 902 named by the string 905 "Products" has subsidiary departments 903, namely children 906, 907 and 908. In turn child1 906 has children child11 909 child11 and child12 910. Managers 904 are depicted at the bottom of FIG. 9. Child12 has manager manager1 911 and manager2 912. Many-valued expressions can also be used in conditions. For instance, to find all managers (in 'Products' or its subsidiaries) whose name ends with the string 'son', you could write

```
from Department products, Manager m
where products.getName( ) = "Products" and
   products.getAChild*( ).getManager( ) = m and
   m.getName( ).matches("%son")
select m
```

Many-valued expressions help write more concise queries because there is no need to name intermediate results. For instance, in the above query, in prior art query languages we would have to explicitly name the result of products.getAChild*( ).

Classes for Various Kinds of Employee

We now turn our attention to building abstractions for different kinds of employees. First, a part-timer is an employee who works part time. For part-timers, it makes sense to introduce an extra method that returns the percentage they work for:

```
class Parttimer extends Employee {
   Parttimer( ) { parttime(this,_) }
   float getPercentage( ) { parttime(this,result) }
}
```

A manager is a special kind of employee, who happens to manage a department. The number of reports for a manager is the sum of the sizes of the departments he manages; it is possible for a manager to be in charge of multiple departments at once. Managers have blue chairs.

```
class Manager extends Employee {
   Manager( ) { manages(this,_) }
   Department getManagesDepartment( ) { manages(this,result) }
   string getChairColor( ) { result="blue" }
   int getNumberOfReports( ) { result=
         sum(Department d |
               d = this.getManagesDepartment( ) |
               d.getSize( )) }
}
```

It is interesting to consider what happens when a manager cycles to work. In that case there will be two most specific classes that define the method getChairColor: the Cycle class (where it returns green) and the above Manager class (where it returns blue). In such cases the .QL engine returns both results, and indeed in Fuzzles Inc., cycling managers have chairs in an attractive striped pattern of both blue and green.

A manager has the title 'vice president' when he has more than 10 reports below him. The chairs of vice-presidents are red:

```
class VP extends Manager {
   VP( ) { this.getNumberOfReports( ) > 10 }
   string getChairColor( ) { result="red" }
}
```

To illustrate the fine points of virtual method dispatch in .QL, and a few of the characteristics that distinguish it from prior art, let us return to our earlier query

```
from Employee e
where e.getName( ).matches("John %")
select e, e.getWorksInDepartment( ), e.getChairColor( )
```

When there is a vice president named John who is a cyclist, he will appear twice in the results, once with a red chair and once with a green chair: in Fuzzles Inc, eco-friendly VPs have chairs that are striped in both red and green. That same person will still be listed twice in the result of the subtly different query

```
from Manager e
where e.getName( ).matches("John %")
select e, e.getWorksInDepartment( ), e.getChairColor( )
```

This is a crucial difference with all earlier proposals for object-oriented query languages that aim to query hierarchies, trees and graphs. Prior work such as that of Serge Abiteboul, Georg Lausen, Heinz Uphoff and Emmanuel Waller. Methods And Rules. In: Peter Buneman and Sushil Jaodia, Proceedings of the 1993 ACM SIGMOD International conference on Management of Data, pages 32-41. ACM Press, 1993 is typical, in that it considers only method definitions in subtypes of the static receiver. For the second query, that means that the definition of getChairColor in the Cyclist class would not be considered. The difference is important, because that implies that in these prior art query languages, when writing a new query, we must understand the whole class hierarchy in the library—which makes the creation of re-usable queries much harder.

The previous query can also be written using an instanceof test for guaranteeing an expression to be of a specific type:

```
from Employee e
where e.getName( ).matches("John %") and
   e instanceof Manager
select e, e.getWorksInDepartment( ), e.getChairColor( )
```

Similarly to mainstream object-oriented languages again, it is possible to cast an expression to a specific type in order to call a method that is defined for that type only. For example:

```
from Employee e
select e, ((Manager)e). getManagesDepartment ( )
```

Note that such a cast triggers no error for employees who are not managers, but instead guarantees, like with instanceof, that all the returned employees are managers. It is therefore again an example where the analogy with existing object-oriented programming languages is useful for building intuition, but the technical details demonstrate it is not a straightforward combination of existing ideas.

In one embodiment, the class definitions may extend multiple classes at once. For a manager that works part time, it makes sense to compute the feasibility metric, i.e. the ratio of time worked divided by the number of reports times 100:

```
class ParttimeManager extends Parttimer, Manager {
   string getChairColor( ) { result="purple" }
   float getFeasibility( ) {
```

-continued

```
        result = (this.getPercentage( ) /
                this.getNumberOfReports( )) * 100
    }
}
```

Note the use of multiple inheritance, which is just logical 'and': a ParttimeManager is both a Parttimer and a Manager.

In FIG. 3, the complete class hierarchy for the above example is shown. Each class [301-307] *301, 302, 303, 304, 305, 306, and 307* corresponds to a characteristic logical property, and we could therefore identify a class with the set of values that satisfies that property. FIG. 4 shows a Venn diagram of those sets for the classes [401-405] *401, 402, 403, 404, and 405* defined above. Finally, FIG. 5 shows the result of running the chair color query. The process of selecting a most-specific implementation of a method (here getChairColor) is shown in FIG. 6.

Implementing .QL

As previously described above, the .QL query language, provides a convenient and expressive formalism in which to write queries over complex data. We discussed the object-oriented features of .QL, which allow complex queries to be packaged up and reused in a highly flexible fashion. These features are essential to build up a library of queries that corresponds to the vocabulary of a problem domain. Now an example of how to implement .QL is discussed. We first describe the intermediate language used for .QL queries, a deductive query language known as Datalog. We then sketch the translation of—QL programs into Datalog. It is well-known how Datalog itself can be implemented (on top of traditional database systems, to find data on the web, or in other sources of semi-structured data), so details of how Datalog itself may be executed are omitted.

Datalog

.QL is a significant extension of a simple form of logic programming known as Datalog, originally designed as an expressive language for database queries. All .QL programs can be translated into Datalog, and the language draws on the clear semantics and efficient implementation strategies for Datalog. In this section we describe the Datalog language before outlining how .QL programs may be translated into Datalog. Datalog is essentially a subset of .QL, and as such we shall be using .QL syntax for Datalog programs. The various sublanguages of .QL and Datalog are depicted in FIG. 7: the object-oriented query language .QL 701, Datalog with various extensions 702 and pure Datalog 703.

Predicates

A Datalog program is a set of predicates defining logical relations. These predicates may be recursive, which in particular allows the transitive closure operations to be implemented. A Datalog predicate definition is of the form:

$$\text{predicate } p(T_1x_1, \ldots, T_nx_n)\{\text{formula}\}$$

This defines a named predicate p with variables $x_1, \ldots, x_n$. In a departure from classical Datalog each variable is given a type. These restrict the range of the relation, which only contains tuples $(x_1, \ldots, x_n)$ where each $x_i$ has the type $T_i$.

The body of a Datalog predicate is a logical formula over the variables defined in the head of the clause. These formulas can be built up as follows:

```
formula ::=
  predicate(variable, . . . , variable)
  | test(variable, . . . , variable)
  | variable = expr
  | not(formula)
  | formula or formula
  | formula and formula
  | exists(Type variable | formula)
```

That is, a formula is built up from uses of predicates through the standard logical operations of negation, disjunction, conjunction and existential quantification. In addition to predicates, tests are allowed in Datalog programs. A test is distinct from a predicate in that it can only be used to test whether results are valid, not generate results. An example of a test is a regular expression match. The test matches("C %",X) is intended to match all strings beginning with "C". Evidently such a test cannot be used to generate strings, as there are infinitely many possible results, but may constrain possible values for X. In contrast, a predicate such as employee(SSN,NAME) may generate values—in this case, the variables SSN and NAME are bound to each pair of elements for which person SSN has name NAME.

Arguments to predicates are simply variables in Datalog, but expressions allow the computation of arbitrary values. Expressions are introduced through formulas such as X=Y+1 defining the value of a variable, and include all arithmetic and string operators. In addition, expressions allow aggregates to be introduced:

```
expr ::=   variable
  | constant
  | expr + expr
  | expr * expr
  | . . .
  | aggregate
```

Our definition of Datalog differs from usual presentations of the language in several respects. The first difference is largely inessential. While we allow arbitrary use of logical operators in formulas, most presentations require Datalog predicates to be in disjunctive normal form, where disjunction can only appear at the top level of a predicate and the only negated formulas are individual predicates. However, any formula may be converted to disjunctive normal form, so this does not represent a major departure from pure Datalog. Expressions, on the other hand, are crucial in increasing the expressiveness of the language. In pure Datalog expressions are not allowed, and this extension to pure Datalog is non-trivial, with an impact on the semantics of the language.

Datalog Programs

A Datalog program contains three parts:

A query. This is just a Datalog predicate defining the relation that we wish to compute.

A set of user-defined, or intensional predicates. These predicates represent user-defined relations to be computed to evaluate the query.

A set of extensional predicates. These represent the elements stored in the database to be queried.

The general structure of a Datalog program therefore mirrors that of a .QL program. The query predicate corresponds to the query in a .QL program, while classes and methods may be translated to intensional predicates. Finally, in the context of program queries the extensional predicates define the information that it stored about the program. Examples were given in the sections above beginning with database annotations.

Semantics and Recursion

The semantics of Datalog program are very straightforward, in particular in comparison to other forms of logic programming such as Prolog. A key property is that termination of Datalog queries is not an issue. The simplicity of the semantics of Datalog programs (and by implication of .QL programs) is an important factor in its choice as an intermediate query language, as it is straightforward to generate Datalog code. It is worth exploring the semantics in a little more detail, however, as a few issues crop up when assigning meaning to arbitrary Datalog programs.

For our purposes, the meaning of a Datalog program is that each predicate defines a relation, or set of tuples, between its arguments. Other, more general, interpretations of Datalog programs are possible such as those described in Allen van Gelder and Kenneth A. Ross and John S. Schlipf. The Well-Founded Semantics For General Logic Programs. Journal of the ACM, volume 38, number 3, pages 620-650, 1991, the teachings of which are hereby incorporated by reference in its entirety. An important feature is that these relations should be finite, so that they may be represented explicitly in a database or in memory. It is customary to enforce this through range restriction, that is to say ensuring that each variable that is an argument to a predicate should be restricted to a finite set. In our case, this is largely straightforward, as each variable is typed. Column types such as @person or @department restrict variables to certain kinds of information already in the database, in this case the sets of classes or reference types in the program. As there can only be finitely many of these, any variable with such a type is automatically restricted. However, primitive types such as int are more troublesome. Indeed it is easy to write a predicate involving such variables that defines an infinite relation:

```
predicate p(int X,int Y){X=Y}
```

This predicate contains all pairs (X,X), where X is an integer, which is infinite and therefore disallowed. For that reason, the type system of—QL ensures that any variable of primitive type is always constrained by a predicate, restricting its range to a finite set.

In the absence of recursion, the semantics of a Datalog program is very straightforward. The program can be evaluated bottom-up, starting with the extensional predicates, and working up to the query. Each relation, necessarily finite by range-restriction, can be computed from the relations it depends on by simple logical operations, and so the results of the query can be found.

The situation is more interesting in the presence of recursion. Unlike other logic programs in which evaluation of a recursive predicate may fail to terminate, in Datalog the meaning of a recursive predicate is simply given by the least fixed point of the recursive equation it defines. As an example, consider the recursive predicate

```
predicate p(int X,int Y){q(X,Y) or (p(X,Z) and q(Z,
    Y))}
```

where q denotes (say) the relation $\{(1,2), (2,3), (3,4)\}$. Then p denotes the solution of the relation equation $P=q \cup P$; q, in which ; stands for relational composition. This is just the transitive closure of q, so the relation p is simply $$p=\{(1,2),(1,3),(1,4),(2,3),(2,4),(3,4)\}$$

This least fixed point interpretation of Datalog programs makes it easy to find the value of any predicate. For instance, consider

```
predicate p(int X){p (X)}
```

This predicate would be nonterminating as a Prolog program. However, in Datalog this is just the least solution of the equation P=P. As every relation satisfies this equation, the result is just the empty relation.

More precisely, the meaning of a Datalog program can be defined as follows. First, break the program up into components, where each component represents a recursive cycle between predicates (formally, a strongly-connected component in the call graph). Evaluation proceeds bottom-up, starting with extensional predicates and computing each layer as a least fixed point as above.

There are two technical restrictions to the use of recursion in Datalog. The first is known as stratification, and is necessary to deal with negation properly. The problem can be illustrated by this simple example:

```
predicate p(@person X){not(p(X))}
```

What should this predicate mean? It is defined as its own complement, so a person lies in p iff it she does not lie in p. There is no relation satisfying this property, so we cannot assign a simple relational interpretation to this program. To avoid this issue, we only consider 'stratified' Datalog. In this fragment of Datalog, negation cannot be used inside a recursive cycle. That is, a cycle through mutually recursive predicates cannot include negation. This is not a problem in practice, and stratification is not a substantial obstacle to expressiveness.

A similar problem is posed by our use of expressions, which does not lie in the scope of classical Datalog. While expressions increase the power of the language, their interaction with recursion is problematic. For instance, consider the following:

```
predicate p(int Y){Y=0 or (Y=Z+1 and p(X,Z))}
```

Clearly 0 lies in p. Therefore 1 must also lie in p from the recursive clause, and in this manner every number n lies in p. The use of expressions in recursive calls may therefore lead to infinite relations, and thus nontermination. In .QL this may also lead to nonterminating queries, and so care must be used when using arithmetic expressions in recursive calls—if, as in the above example, the expression can create new values for each recursive call, then the query may be non-terminating.

Translating .QL

The precise semantics of .QL programs are defined by their translation into Datalog programs. The overall structure of .QL programs mirrors that of Datalog programs. In particular, the query in a .QL program is translated into a Datalog query, while methods and classless predicates are translated to Datalog intensional predicates.

Translating Queries

The general form of a .QL query (ignoring order by clauses, which merely amount to a post-processing step) is:

```
from T1 x1, T2 x2, . . ., Tn xn
where formula
select e1, e2, . . . , ek
```

where each $e_i$ is an expression, and each $x_i$ is a declared variable of type $T_i$.

It is straightforward to translate this to a Datalog query, which is just a standard predicate. The resulting relation has k parameters (one for each selected expression), and so the query predicate has k parameters. The variables $x_1$ through $x_n$ can be introduced as local variables, defined by an existential quantifier. As a result, the Datalog translation of the above query, omitting types, is:

```
predicate p(res_1, res_2, . . . , res_k) {
    exists (T_1 x_1, T_2 x_2, . . . , T_n x_n |
      formula_2
      and res_1 = e_1
      and res_2 = e_2
      and . . .
      and res_k = e_k
    )
}
```

where $formula_2$ is obtained from formula by translating away all non-Datalog features of .QL, and in particular method calls, as described below.

Translating Classes

Classes are translated into individual Datalog predicates, representing constructors, methods and class predicates. In most cases the translation is straightforward, the key aspect being the translation of method calls.

A .QL method is merely a particular kind of Datalog predicate involving two special variables—this and result. The this variable holds the value that is a member of the class, while the result variable holds the result of the method. As an example, consider the following method to compute a string representation of an employee:

```
class Employee extends @person {
  . . .
  string toString( ) {result="employee:"+this.getName( ) }
}
```

This is translated into the following Datalog predicate:

```
predicate Employee_toString(Employee this, string result)
  { exists(string name |
    Employee_getName(this,name) and
    result="employee:"+name)
  }
```

The translation of parameterless methods extends to methods taking an arbitrary number of parameters, in which case the two parameters this and result are simply added to the list of parameters. Apart from the translation of method inheritance, which we will describe shortly, there are few differences between the body of the method and the body of the generated predicate. Class predicates are similar, but as predicates do not return a value, the result variable is not used.

The above example highlights one of the crucial advantages of .QL methods over Datalog predicates, in addition to extensibility. In Datalog, it is necessary to name each intermediate result, as is the case with the name variable in the above example, which had to be declared with exists. In contrast, methods returning (many) values allow queries to be written in a much more concise and readable manner.

Finally, constructors are simply translated to Datalog predicates denoting the character of each class. For instance, consider the definition of the Manager class discussed earlier:

```
class Manager extends Employee {
  Manager( ) { manages(this,_) }
. . .
}
```

The constructor for this class is translated into a predicate defining precisely those persons who are Managers. These are the Employees that additionally occur in the first column of the manages relation in the database:

```
predicate Manager(Employee this) {
  manages(this,_)
}
```

When a class inherits from multiple classes, the translation is a little more complicated. Consider the class class ParttimeManager extends Parttimer, Manager { . . . }

This class extends both Parttimer and Manager, and thus a person is a ParttimeManager exactly when she is both a Parttimer and a Manager. This is encoded in the generated characteristic predicate for ParttimeManager:

predicate ParttimeManager(Manager this) {Parttimer (this)}

Despite the fact that ParttimeManager does not define a constructor, it restricts the range of values that it encompasses by inheritance, and thus this characteristic predicate must be generated.

Characteristic predicates are also used for the translation of casts and instanceof tests. To guarantee an expression e to be of a specific type T, a call to the characteristic predicate of T is generated with the expression e passed as its single argument.

Translating Method Calls

In the above, we have described the translation of methods into Datalog predicates with extra arguments this and result, and informally shown some method calls translated into calls to the generated predicates. In our examples, the translation was straightforward, as the type of the receiver was known, and so it was immediately apparent which predicate should be called. However, as .QL uses virtual dispatch, the method that is actually used depends on the value it is invoked on, and the previous translation scheme cannot work in general.

To illustrate the translation of method dispatch in .QL, consider the following class hierarchy:

```
class All {
  All( ) { this=1 or this=2 or this=3 or this=4 }
  string foo( ) { result = "A" }
}
class OneOrTwo extends All {
  OneOrTwo( ) {this=1 or this=2 }
  string foo( ) {result ="B" }
}
class TwoOrThree extends All {
  TwoOrThree( ) {this=2 or this=3 }
  string foo( ) {result="C" }
}
```

As we have seen previously, each of the implementations of foo is translated into a Datalog predicate:

```
predicate All_foo(All this, string result) { result = "A" }
predicate OneOrTwo_foo(OneOrTwo this, string result) {
  result = "B"
}
predicate TwoOrThree foo(TwoOrThree this, string result) {
  result = "C"
}
```

However, when a call to the foo method is encountered, the appropriate methods must be chosen, depending on the value of the receiver of the call. .QL method dispatch selects the most specific methods, of which there may be several due to overlapping classes, and returns results from all most specific methods. Only the most specific methods are considered, so that a method is not included if it is overridden by a matching method.

This virtual dispatch mechanism is implemented by defining a dispatch predicate for each method, testing the receiver against the relevant types and choosing appropriate methods. Testing the type of the receiver is achieved by invoking the characteristic predicate for each possible class, leading to the following dispatch method for foo:

```
predicate Dispatch_foo(All this, string result) {
    OneOrTwo_foo(this, result)
  or TwoOrThree_foo(this, result)
  or (not(OneOrTwo(this)) and not(TwoOrThree(this))
    and All_foo(this, result))
}
```

Let us examine this dispatch predicate a little more closely. The parameter this is given type All, as this is the most general possible type in this case. The body of the predicate consists of three possibly overlapping cases. In the first case, the foo method from OneOrTwo is called. Note that this only applies when this has type OneOrTwo, due to the type of the this parameter in OneOrTwo. As OneOrTwo does not have any subclasses, its foo method cannot be overridden, and whenever it is applicable it is necessarily the most specific. The second case is symmetrical, considering the class TwoOrThree. These cases are overlapping, if this=2, and so the method can return several results. Finally, the third case is the default case. If this did not match either of the specific classes OneOrTwo or TwoOrThree, the default implementation in All is chosen.

Suppose now that we extend the example by adding two further class definitions, namely

```
class OnlyTwo extends OneOrTwo, TwoOrThree {
  foo( ) { result = "D" }
}
class AnotherTwo extends All {
  AnotherTwo( ) { this = 2 }
  foo( ) { result = "E" }
}
```

In this new hierarchy, we added two classes with exactly the same characteristic predicate. This changes method dispatch whenever this=2, as the newly introduced methods are more specific than previous methods for this case. To extend the previous example with these new classes, we simply lift out the new implementations of foo:

```
predicate OnlyTwo_foo(OnlyTwo this, string result) {
  result = "D"
}
predicate AnotherTwo_foo(AnotherTwo this, string result) {
  result = "E"
}
```

and change the dispatch predicate accordingly:

```
predicate Dispatch_foo(All this, string result) {
    OnlyTwo_foo(this, result)
  or AnotherTwo_foo(this, result)
```

-continued

```
  or (not(OnlyTwo(this))
    and OneOrTwo_foo(this, result))
  or (not(OnlyTwo(this))
    and TwoOrThree_foo(this, result))
  or (not(OneOrTwo(this))
    and not(TwoOrThree(this))
    and not (AnotherTwo(this))
    and All_foo(this, result))
}
```

The only changes, apart from the introduction of cases for the two new classes, is that the existing cases for OneOrTwo, TwoOrThree and All must be amended to check whether the method is indeed the most specific one.

Finally, a method call adorned with the chaining operator + or * is translated to a call to a predicate encoding the transitive closure, or reflexive transitive closure respectively, of the original method call. For instance, d.getAChild+( )translates to a call to:

```
predicate getAChildTC (Department X, Department Y) {
  Department_getAChild(X,Y) or
  (getAChildTC (X,Z) and Department_getAChild(Z,Y))
}
```

Embodiments

One particular way the invention can be realized is depicted in FIG. 2. A user 201 writes a query 203, using the library 202 of re-usable queries that is created via classes in .QL. The query is translated into a Datalog intermediate representation 205, and at that level optimizations are applied. The Datalog is then converted into SQL 206. Next, the SQL is run on a relational database 207, producing the answer 204 and reporting it back to the user.

Other possible realizations are obtained by replacing SQL and the database in FIG. 2 by other search engines. As an example FIG. 10 is a block diagram of a computer system with multiple datasources [1006-1008] *1006, 1007, and 1008* which can be searched by user 1001 from a single .QL query [1002-1005] *1002, 1003, 1004, and 1005*, possibly simultaneously to return answer 1009. Note in particular the differences between FIG. 2 and FIG. 10: the single database 207 has been replaced by multiple datasources 1006, 1007 and 1008. This illustrates an important aspect of the present invention, i.e., the capability to simultaneous search across multiple data sources, regardless of the format the data is stored in.

Examples of such other search engines are a search engine for XML documents, a text-based search engine, an API for accessing web services, anAPI for querying information on a social networking site, any other search engine for social networking sites, an online patent database search engine, a search engine for financial data, enterprise search engines, tools for software asset management (which store software assets in some searchable format), and so on.

Non-Limiting Hardware Examples

Overall, the present invention can be realized in hardware or a combination of hardware and software. The processing system according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

FIG. 12 is a block diagram of an information processing system such as a computer system useful for implementing the software steps of the present invention. Computer system 1200 includes a display interface 1208 that forwards graphics, text, and other data from the communication infrastructure 1202 (or from a frame buffer not shown) for display on the display unit 1210. Computer system 1200 also includes a main memory 1206, preferably random access memory (RAM), and optionally includes a secondary memory 1212. The secondary memory 1212 includes, for example, a hard disk drive 1214 and/or a removable storage drive 1216, representing a floppy disk drive, a magnetic tape drive, an optical disk drive, etc. The removable storage drive 1216 reads from and/or writes to a removable storage unit 1218 in a manner well known to those having ordinary skill in the art. Removable storage unit 1218, represents a CD, DVD, magnetic tape, optical disk, etc. which is read by and written to by removable storage drive 1216. As will be appreciated, the removable storage unit 1218 includes a computer usable storage medium having stored therein computer software and/or data. The terms "computer program medium," "computer usable medium," and "computer readable medium" are used to generally refer to media such as main memory 1206 and secondary memory 1212, removable storage drive 1216, a hard disk installed in hard disk drive 1214, and signals.

Computer system 1200 also optionally includes a communications interface 1224. Communications interface 1224 allows software and data to be transferred between computer system 1200 and external devices. Examples of communications interface 1224 include a modem, a network interface (such as an Ethernet card), a communications port, a PCMCIA slot and card, etc. Software and data transferred via communications interface 1224 are in the form of signals which may be, for example, electronic, electromagnetic, optical, or other signals capable of being received by communications interface 1224. These signals are provided to communications interface 1224 via a communications path (i.e., channel) 1226. This channel 1226 carries signals and is implemented using wire or cable, fiber optics, a phone line, a cellular phone link, an RF link, and/or other communications channels.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A process [for creating re-usable queries over complex data, the process] comprising:

[defining a re-usable object-oriented] *receiving queries defined in a first* query language [with] *in which logical properties are represented by* object-oriented classes [treated as logical properties], [wherein each logical property is defined by one or more specified classes of at least one complex data item] *and in which inheritance relationships between the classes represent relationships between the logical properties, and wherein the queries include requests for data items having requested logical properties*;

[relating inheritance, used to form new class with the specified classes, to the logical properties along with a plurality of virtual method calls that execute all applicable method implementations in at least one of the specified classes;] and

*in response to the queries requesting data items having logical properties encoded as methods of particular classes,* dispatching on the [logical properties] *particular classes* to choose [at least one] *one or more* most specific [implementation] *implementations* of [an operation] *the methods*, wherein a most specific implementation *of a method* is in a class where no [subclasses define a same method] *other classes that inherit from the class include an implementation of the method*, wherein the dispatching on the [logical properties] *particular classes* further includes:

[defining] *identifying* a named predicate p as predicate $p(T_1x_1, \ldots, T_nx_n)$ {formula} for each one of the [applicable method] *most specific* implementations, wherein the named predicate p has variables $x_1, \ldots, x_n$. so as to restrict a range of a relation, which contains tuples $(x_1, \ldots x_n)$ where each $x_i$ has a type [T] $T_i$;

testing a receiver against each [relevant] type and choosing [the] applicable method implementations *from the most specific implementations*, wherein testing a type of the receiver [is achieved by] *includes* invoking a named constructor for each class defining a [method of a relevant signature] *most specific implementation*, regardless of static types;

[implementing queries by] translating [actual or possibly recursive object-oriented] *the* queries to a *second* query language using for each method and constructor of each class, a first special variable that holds a value that is a member of the class, and for each method that is not a predicate, a second special variable that holds a result of a method; and

[rending] *rendering the* queries concise by at least using multi-valued operations to avoid naming intermediate results in nested method calls.

2. The process as set forth in claim 1, wherein *translating* the [implementing] queries includes mapping each constructor to a named characteristic predicate of its class, which tests whether a value belongs to the class, by taking a logical conjunction of characteristic predicates of all superclasses and a property specified in the constructor.

3. The process as set forth in claim [1] *2*, wherein *translating* the [implementing] queries includes mapping instanceof tests and cast expressions to calls of [such] *each* characteristic predicates.

4. The process as set forth in claim 1, wherein *translating* the [implementing] queries includes mapping expressions including nested method calls to a conjunction of predicate calls, with a new named variable denoting an intermediate result of each method call.

5. The process as set forth in claim 1, wherein [the implementing queries by] translating [actual or possibly recursive object-oriented] *the* queries to the *second* query language produces queries in Datalog and wherein at least one search engine is targeted by translating a same intermediate Datalog to different executable formats.

6. The process as set forth in claim 1, wherein *rendering* the queries [are rendered] concise [by] *includes* at least one of:

using a * notation and a + notation on multi-valued operations to indicate a chained application of such operations; [and] *or* using an aggregate notation with variables, a range condition and an expression (agg(vars|condition|expr)).

7. The process as set forth in claim 1, wherein [complex data] *at least one of the data items* is stored in a [standard relational database] *data storage*, and [column types are used to build a hierarchy of object-oriented classes on top of an existing relational database, by annotating an existing relational schema] *relationships between the logical properties are identified in a data format definition for the data storage storing the data item*.

8. The process as set forth in claim 1, wherein at least one *of the data items is a* complex data item [is at] *and includes* least one of:

a data item in a hierarchy;

a tree; [and] *or* a graph.

9. The process as set forth in claim 1, wherein [an object-oriented query language is in any form depending on a domain of object-oriented query language use, including] *instructions in the first query language are represented in* at least one of:

a textual form;

a graphical form;

a query-by-example [user interface] *form*; [and] *or an* embedded [in a more general] *form within another* programming language.

10. The process as set forth in claim [1] *7*, wherein [complex data is stored in a plurality of datasource formats including] *the data storage includes* at least one of:

a relational database;

a web service;

a web page; [and] *or* a *structured data* file [on hard disk and column types are used to build a hierarchy of object-oriented classes on top of such data formats, by annotating each relevant data format schema].

11. A computer program product [for creating re-usable queries over complex data, the computer program product] comprising:

a non-transitory computer readable storage medium, the non-transitory computer readable storage medium storing software programming instructions capable of performing with a processor programming code to carry out:

[defining a re-usable object-oriented] *receiving queries defined in a first* query language [with] *in which logical properties are represented by* object-oriented classes [treated as logical properties], [wherein each logical property is defined by one or more specified classes of at least one complex data item] *and in which inheritance relationships between the classes represent relationships between the logical properties, and wherein the queries include requests for data items having requested logical properties*;

[relating inheritance, used to form new class with the specified classes, to the logical properties along with a plurality of virtual method calls that execute all applicable method implementations in at least one of the specified classes;] and

*in response to the queries requesting data items having logical properties encoded as methods of particular classes,* dispatching on the [logical properties] *particular classes* to choose [at least one] *one or more* most specific [implementation] *implementations* of [an operation] *the methods*, wherein a most specific implementation *of a method* is in a class where no [subclasses define a same method] *other classes that inherit from the class include an implementation of the method*, wherein the dispatching on the [logical properties] *particular classes* further includes:

[defining] *identifying* a named predicate p as predicate p(T1x1, . . . , Tnxn) {formula} for each one of the [applicable method] *most specific* implementations, wherein the named predicate p has variables x1, . . . , xn so as to restrict a range of a relation, which contains tuples (x1, . . . , xn) where each xi has a type Ti;

testing a receiver against each [relevant] type and choosing [the] applicable method implementations *from the most specific implementations*, wherein testing a type of the receiver [is achieved by] *includes* invoking a named constructor for each class defining a [method of a relevant signature] *most specific implementation*, regardless of static types;

[implementing queries by] translating [actual or possibly recursive object-oriented] *the* queries to a *second* query language using for each method and constructor of each class, a first special variable that holds a value that is a member of the class, and for each method that is not a predicate, a second special variable that holds a result of a method; and

[rending] *rendering the* queries concise by at least using multi-valued operations to avoid naming intermediate results in nested method calls.

12. The computer program product of claim 11, wherein *translating* the [implementing] queries includes mapping each constructor to a named characteristic predicate of its class, which tests whether a value belongs to the class, by taking a logical conjunction of characteristic predicates of all superclasses and a property specified in the constructor.

13. The computer program product of claim [11] *12*, wherein *translating* the [implementing] queries includes mapping instanceof tests and cast expressions to calls of [such] *each* characteristic [predicates] *predicate*.

14. The computer program product of claim 11, wherein *translating* the [implementing] queries includes mapping expressions including nested method calls to a conjunction of predicate calls, with a new named variable denoting an intermediate result of each method call.

15. The computer program product of claim 11, wherein [the implementing queries by] translating [actual or possibly recursive object-oriented] *the* queries to the *second* query language produces queries in Datalog and wherein at least one search engine is targeted by translating a same intermediate Datalog to different executable formats.

16. An information processing system [for creating re-usable queries over complex data, the system] comprising:

a computer memory capable of storing machine instructions; and a processor in communication with said computer memory, said processor configured to access the memory[, the processor performing a re-usable object-oriented query language defined with object-oriented classes treated as logical properties, wherein each logical property is defined by one or more specified classes of at least one complex data item;

a new class formed by relating inheritance with the specified classes, to the logical properties along with a plurality of virtual method calls that execute all applicable method implementations in at least one of the specified classes; and] *and execute the machine instructions to perform operations comprising:*

*receiving queries defined in a first query language in which logical properties are represented by object-oriented classes, and in which inheritance relationships between the classes represent relationships between the logical properties, and wherein the queries include requests for data items having requested logical properties;*

[means for] *in response to the queries requesting data items having logical properties encoded as methods of particular classes,* dispatching on the [logical properties] *particular classes* to choose [at least] one *or more* of a most specific [implementation] *implementations* of [an operation] *the methods*, wherein a most specific implementation *of a method* is in class where no [subclasses define a same method] *other classes that inherit from the class include an implementation of the method*, wherein the dispatching on the [logical properties] *particular classes* further includes:

[means for defining] *identifying* a named predicate p as predicate $p(T_1x_1, \ldots T_nx_n)$ {formula} for each one of the [applicable method] *most specific* implementations, wherein the named predicate p has variables $x_1, \ldots x_n$. so as to restrict a range of a relation, which contains tuples $(x_1, \ldots, x_n)$ where each $x_1$ has a type $T_i$;

[means for] testing a receiver against each [relevant] type and choosing [the] applicable method implementations *from the most specific implementations*, wherein testing a type of the receiver [is achieved by] *includes* invoking a named constructor for each class defining a [method of a relevant signature] *most specific implementation*, regardless of static types;

[means for implementing queries by] translating [actual or possibly recursive object-oriented] *the* queries to a *second* query language using for each method and constructor of each class, a first special variable that holds a value that is a member of the class, and for each method that is not a predicate, a second special variable that holds a result of a method; and

[means for rending] *rendering the* queries concise by at least using multi-valued operations to avoid naming intermediate results in nested method calls.

17. The system of claim 16, wherein *translating* the [implementing] queries includes mapping each constructor to a named characteristic predicate of its class, which tests whether a value belongs to the class, by taking a logical conjunction of characteristic predicates of all superclasses and a property specified in the constructor.

18. The system of claim [16] *17*, wherein *translating* the [implementing] queries includes mapping instanceof tests and cast expressions to calls of [such] *each* characteristic predicates.

19. The system of claim 16, wherein *translating* the [implementing] queries includes mapping expressions including nested method calls to a conjunction of predicate calls, with a new named variable denoting an intermediate result of each method call.

20. The system of claim 16, wherein [the implementing queries by] translating [actual or possibly recursive object-oriented] *the* queries to the *second* query language produces queries in Datalog and wherein at least one search engine is targeted by translating a same intermediate Datalog to different executable formats.

* * * * *